United States Patent [19]

Green

[11] Patent Number: 5,058,756

[45] Date of Patent: Oct. 22, 1991

[54] STRESSED SIDE PLAT VEHICLE BODY

[75] Inventor: Stephen Green, Charleston, Ill.

[73] Assignee: Trailmobile, Inc., Chicago, Ill.

[21] Appl. No.: 568,849

[22] Filed: Aug. 17, 1990

[51] Int. Cl.$^5$ ............................................. B62D 33/04
[52] U.S. Cl. .................................... 220/1.5; 296/181;
52/395; 220/692
[58] Field of Search .............. 220/1.5, 692, 677, 652,
220/681; 296/181, 183, 191; 52/395, 459, 467

[56] References Cited

U.S. PATENT DOCUMENTS

| | | | |
|---|---|---|---|
| 1,681,758 | 8/1928 | Wight | 52/395 X |
| 4,685,721 | 8/1987 | Banerjea | 296/181 |
| 4,810,027 | 3/1989 | Ehrlich | 296/181 |
| 4,840,127 | 6/1989 | Tomaka | 296/181 X |

Primary Examiner—Steven M. Pollard
Attorney, Agent, or Firm—Myers & Assoc., Ltd.

[57] ABSTRACT

A semi-monocoque or stressed skin cargo vehicle uses plates interconnected and reinforced by flanged side posts and the plates are sandwiched between by top and bottom rails and the posts, the flanges being of substantially the same thickness as the plates.

12 Claims, 3 Drawing Sheets

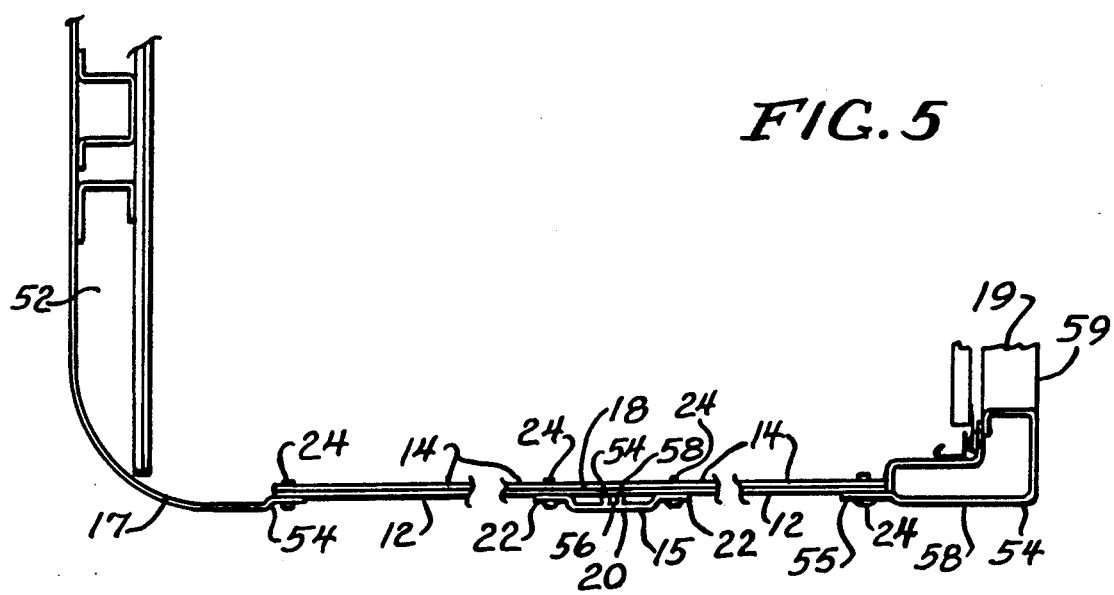
FIG. 5
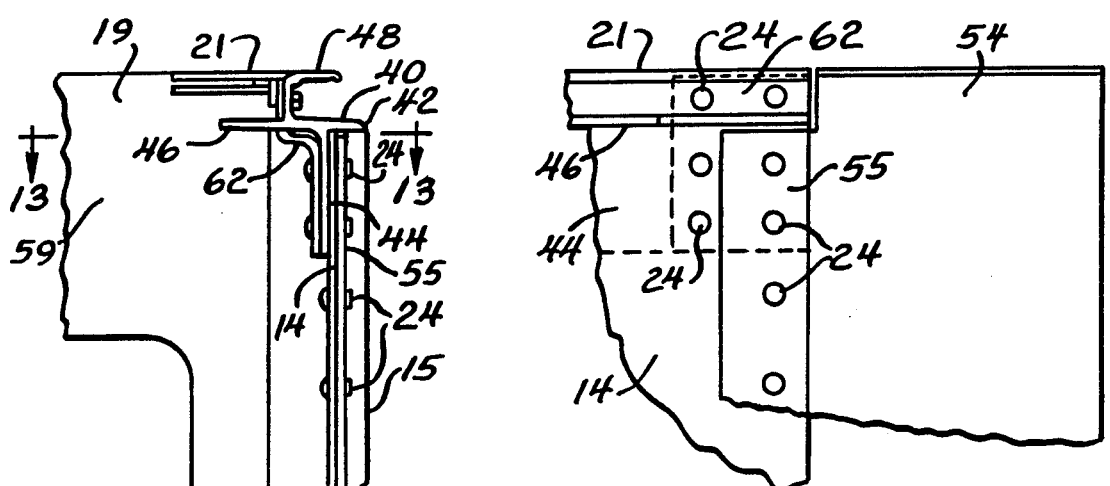
FIG. 6
FIG. 7
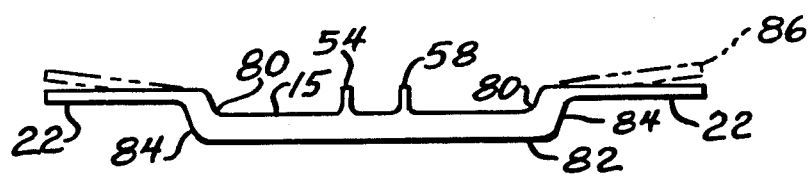
FIG. 8

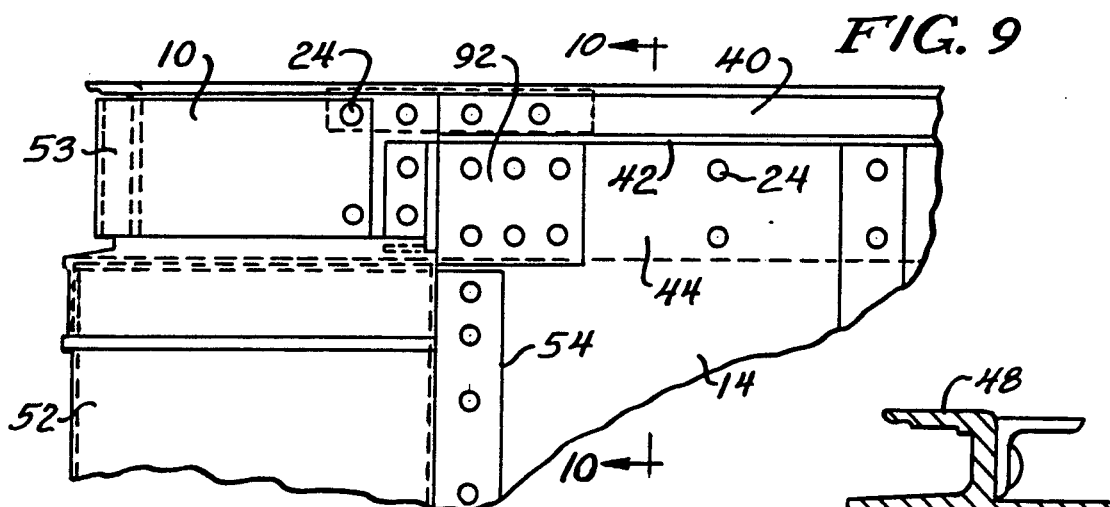
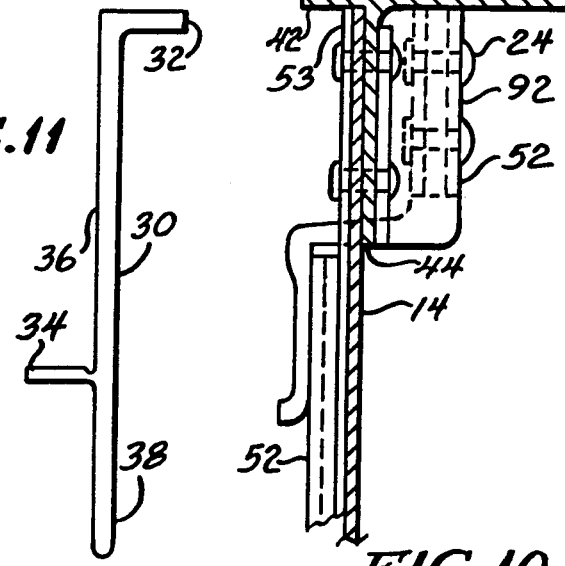
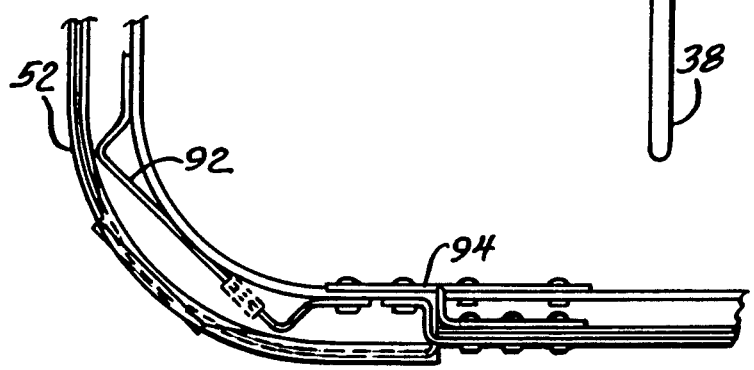
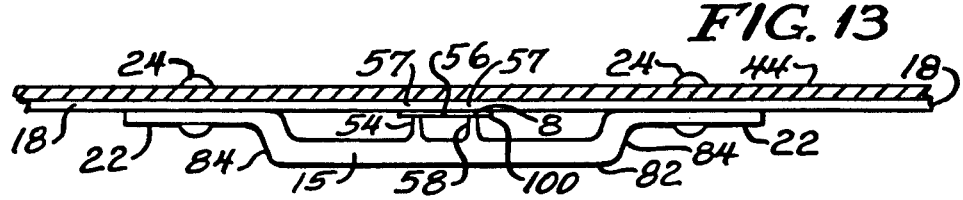
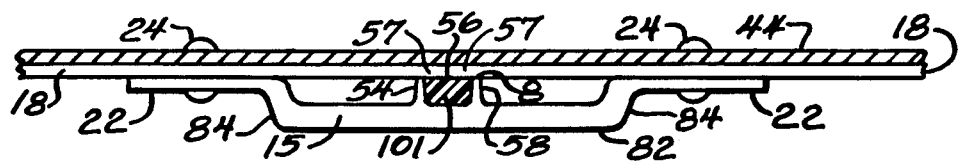

STRESSED SIDE PLAT VEHICLE BODY

BACKGROUND OF THE INVENTION

1. Field of the Invention

The invention relates to vehicle bodies, particularly semi-trailers constructed in a semi-monococque structure with stressed plates joined with top and bottom rails and external vertical bracing through external side posts or vertical supports thereby achieving improved strength to weight ratio and maximizing internal cubic capacity.

2. Description of the Prior Art

Various methods of construction of semi-trailer side walls have been used. Typically side wall panels are continuous and stiffened by internal or external vertical side posts (see e.g., Glassmeyer U.S. Pat. No. 3,815,500). Placement of structural side posts or "stakes" with the space therebetween filled by panels is shown in Glassmeyer U.S. Pat. No. 4,042,275. The use of side posts as major structural members has a major disadvantage in that the thickness of the structural posts detracts from available volume or cubic capacity within the semi-trailer either by displacing the wall inward from the maximum width of the trailer, fixed by law or administrative regulation in most jurisdictions, or by the protrusion of internal side post into the cargo area. Both alternatives effectively limit the width available internally for typical packaged or non-bulk cargo, and thereore the cubic capacity.

Accordingly various efforts have been made to utilize a stronger wall element, in particular aluminum plate, while using side posts of minimal thickness thereby maximizing internal volume or cubic capacity for a given strength and weight and given regulatory width limitations. Examples of these include Banerjea, U.S. Pat. No. 4,685,721 and Ehrlich, U.S. Pat. No. 4,810,027.

Banerjea uses vertical joining panels in order to interconnect a series of plates. Joining panels are used rather than side posts or support members because varying thickness plates are utilized to optimize shear strength in selected portions of the vehicle, as near the fifth wheel king pin, landing gear and rear bogies or rear suspension assembly. By comparison, the instant invention uses a refined geometry for the side post itself, integrally utilizing top and bottom rails providing an improved unitary structure.

Ehrlich U.S. Pat. No. 4,810,027 specifically addresses a structure which in section utilizes a side post, a side lap and butted side plates. The disclosure is limited to the use of the side lap element both to form a box-like structure and to seal gaps created by the specific geometry used in the Ehrlich top rail, side post assembly and bottom rail structure. The instant invention uses improved geometry to dispense with the side lap, yet the unitary structure provides an appropriate strength and operatively sealed structure.

Other prior art tending to show frameless or monococque vehicle body or semi-trailer construction includes Schmidt, U.S. Pat. No. 4,212,405 which uses thick plate including internal posts or stiffeners and limiting to certain stock dimensions and standard alloys. Curell U.S. Pat. No. 2,901,283 utilizes external side posts with a series of elongated diagonal members forming substantially open or perforated side walls.

BRIEF DESCRIPTION OF THE DRAWINGS

FIG. 5 is a sectional view showing the front and rear corners and a portion of a side wall of the structure.

FIG. 6 is a sectional view of a top corner of a vehicle body looking rearwardly.

FIG. 7 is an elevation of a portion of a top rear corner.

FIG. 8 is a sectional view of a side post.

FIG. 9 is a fragmentary elevational view of a portion of the top front corner.

FIG. 10 is a sectional view of a top corner looking toward the front.

FIG. 11 is an elevation of the bottom rail shown in the view of FIG. 2.

FIG. 12 is a sectional view of a top front corner.

FIG. 13 is a sectional view at the top rail flange.

FIG. 14 is a sectional view at the top rail flange.

DETAILED DESCRIPTION OF THE PREFERRED EMBODIMENT

Figure 1:
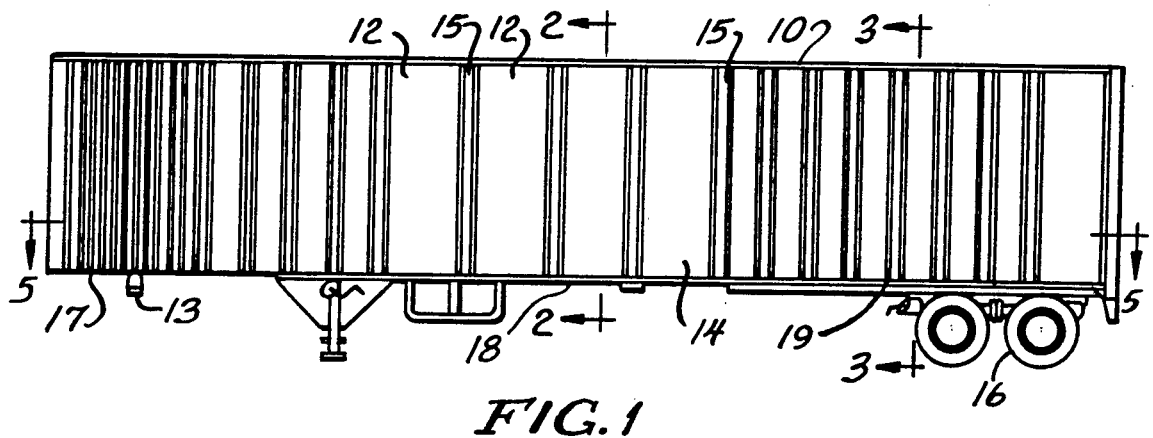
FIG. 1 is an elevation of a semi-trailer.

FIG. 1 shows a vehicle body 10 with front 17 and rear 19 portions. The preferred embodiment shows a semi-trailer, however, the invention is also applicable to items such as railroad cars or shipping containers of similar construction.

As shown in FIGS. 1, 2, 3, 5, 6, and 7, the body or semi-trailer 10 has sides 12 comprising a series of side plates 14 of generally rectilinear form having top and bottom edges and vertical edges butted to one another. Vertical side posts or support members 15 both join the plates 14 and provide added structural strenth and rigidity. The semi-trailer undercarriage includes a bogie assembly 16 at rear and kingpin and fifth wheel engagement assembly 13 at the front portion 17. The body can generally be seen to comprise a front portion 17, center portion 18 and rear portion 19.

Figure 2:
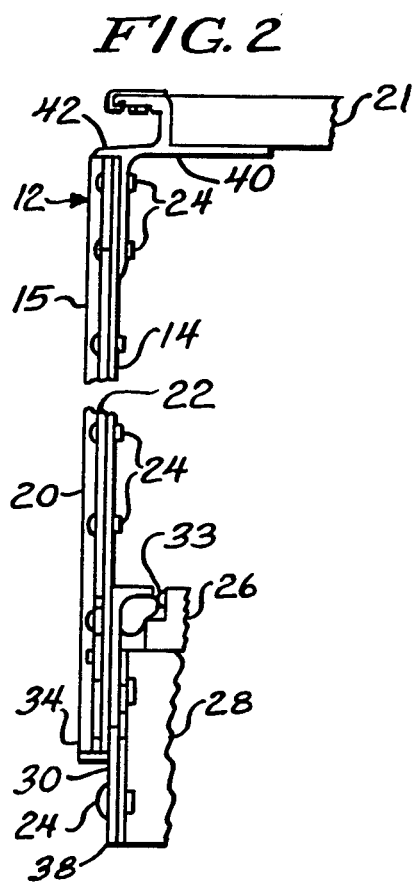
FIG. 2 is a sectional view showing the side wall and side post construction.

FIG. 2 is a sectional view of the side wall 12. A transverse member 28 comprising a portion of the undercarriage supporting floor 26 and mounted to bottom rail 30 is fastened thereto, using rivets 24 or other appropriate fastening means. The side wall plate and post assembly 20 comprises the vertical posts 15 extending upwardly from the bottom rail 30. The plate 14 is sandwiched between a portion of bottom rail 30 and post 15. Top rail 40 sandwiches plate 14 with the upper portion of post 15. Top rail 40 further supports roof 21.

Figure 3:
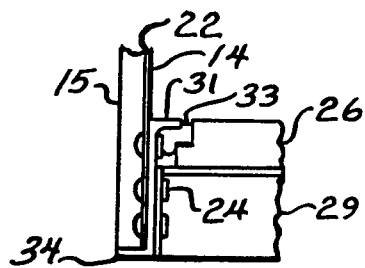
FIG. 3 is a sectional view showing a lower corner of the structure.

FIG. 3 is a sectional view of a bottom corner associated with the rear portion 16 of the vehicle body 10. It will be noted that transverse member 29 is of narrower width than the equivalent member 28 in FIG. 2, and accordingly an alternate bottom rail 31 is used to conforming to the specific undercarriage structure at the rear portion of the trailer. Because of the presence of the additional reinforcing longitudinal members of the bogie assembly and the commensurate need for additional clearance this variant structure is appropriate. Visible in this view is a portion of side post 15 with upwardly extending flange 22 sandwiching side wall plate 14 between said post 15 and bottom rail 31. Outwardly extending flange or sill 34 strengthens the rail 31 and also supports post 15. Top rail 40 (FIG. 4) includes downwardly depending flange or leg 44, outwardly projecting flange 42, inwardly projecting flange 46 and an L-shaped roof flange 48. This view shows an extrusion looking forward corresponding to FIG. 2.

Figure 4:
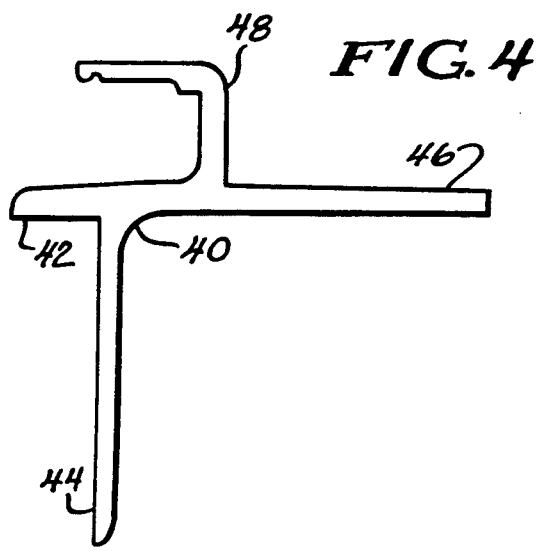
FIG. 4 is an end view showing a top rail extrusion.

It will be noted in reference to FIG. 2 and FIG. 6 in light of FIG. 4 that downwardly depending flange 44 sandwiches plate 14 between itself and vertical post 15. Fasteners 24 extend through post flange 22 interconnecting the sandwich structure. An overlying and outwardly extending flange 42 provides a covering element for the top portion of the post 15. Flanges 46 and 48 in conjunction with roof assembly 21 provide structural support and weather-tight sealing.

FIG. 5 is a fragmentary sectional view of the side wall structure 12 extending between the forward portion 17 and rear portion 19 of the vehicle body. At the front portion 17, the front end assembly 52 is attached to the side 12. Front end assembly 52 is constructed commensurate with requirements for strength, internal volume, aerodynamics, clearance requirements and accessory mounting needs. In this embodiment, a reinforced front end structure 52 presents a curved corner, which assembly optimizes these considerations.

As shown in FIGS. 5 and 9, mounting flange 54 connects the assembly to the side wall 12 specifically through the fastening to the first of a series of plates 14 with fasteners 24. Flange 54 substantially conforms to flange 22 in its configuration relative to plate 14.

Side post and plate assembly 20 and two plates 14 form butt-joint 56 for vertical edges 57, 58. Side post or vertical support member 15 span the joint with flanges 22 extending forwardly and rearwardly and attached to plates 14 with fasteners 24a.

As further seen in FIG. 5, the rear portion 19 includes rear corner post 58' with mounting flange 55 and door assembly 59. Door assemblies in particular are available from vendors separately from the trailer manufacturers, and installed as a unit. These may include overhead tambour-style doors, paired vertically-hinged doors or other arrangements commensurate with the needs of the user.

FIG. 6 shows a rearward looking section of the top rear corner at the rear portion 19. Rear corner post 54' and door assembly 59 additional reinforcing bracket 62 strengthens the corner structure to better withstand loads imposed both by normal cargo operations and unusual concentrations from door operations. Flange 46 terminates short of the corner post (also visible with reference to FIG. 7) thereby permitting the fitting of brace 62.

In alternative embodiments as in cargo containers, which are substantially rectangular in design and which use standardized corner posts for fastening in vehicles and interlocking with corresponding containers, front 17 and rear 19 assemblies may be substituted by standardized container corner castings and structures without departing from the plate-sided construction described herein.

FIG. 8 shows side post or vertical support member 15 in a top plan view. Central web 82 extends through inwardly turned part 84 merging into flange 22. It will be noted the transition at shoulders 80, 80 is substantially a series of smooth radii with the thickness of web 82 being carried through portion 84 and reducing forming flange 22.

In the preferred embodiment the flanges 22 are substantially the same thickness as the plates 14. (Noting FIGS. 13, 14) Several advantages are presented by this conformation. Stress concentrations in the plate are reduced compared to a thicker section flange. Disparity in performance under load between the flange portion and the portion of the sheet adjacent thereto is reduced resulting in net increased strength of the portions as a unit when fastened together. Advantageous use of sections permits overall weight savings as heavy side posts are eliminated. Assembly of the vehicle body is facilitated by use of standardized thicknesses in both flange and plate; including use of shorter rivets and ease in placement of fastener holes, as by punching.

Shown in phantom is flange portion 86 wherein the flange is distended inwardly. In the preferred embodiment a minimum zero degree deflection between position 86 and flange 22 is permitted. In this manner, flange 22 extending outwardly no more than parallel to central web 82 will in no instance have less than maximum surface area in contact with plate 14. The slight offset to portion 86 enhances the strength of the structure in that a slight offset when the entire structure is put in place will result in an interference fit between the flange and plate improving the sealing and structural properties. Riveting a slightly offset flange 86 will further pre-load the plate and side post structure 20, thereby minimizing oscillation or "oil canning" of the structure.

Flanges or ribs 57a and 58b (FIG. 8) project inwardly from the center web 82 of the posts substantially perpendicular thereto. As shown in conjunction with FIG. 5 these paired flanges define a groove or space 78 between them which spans the butt joint 56 of the plates 12. While the flanges 22 and plates 12, fastened together, provide for the strength of the side or wall, the joint flanges 57a and 58b maintain the integrity of the butt joint 56. These members also facilitate sealing of joint 56 by bearing on and compressing a flexible tape sealing member in the preferred as will be described. Groove or space 78 could also be caulked to seal the joint 56 as also will be apparent.

FIGS. 9, 10 and 12 show the front top corner of the vehicle body 10. Front assembly 52 includes at its top portion a top rail continuation or cap 53. The top rail structure 40 around the forward part of the assembly 52. This view in conjunction with FIGS. 10 and 12 shows flange 42 terminating short of cap 53 which is carried forward in a configuration substantially conforming to flange 40 extending around through a curve which is reinforced by brackets 92 and 94 at the junction with plate 14.

FIG. 11 shows bottom rail 30 with inwardly depending flange 32 shown in connection with FIG. 2 as corresponding to the floor 26 of the vehicle body 10. Outwardly extending horizontal flange 34, as shown in connection with FIG. 2 and FIG. 3, provides support, bottom sealing and alignment for side post 15. Web 36, extending between flanges 34 and 32, provides a substantial surface area and structure for mounting side post 15, permitting insertion of several pairs of fasteners 24 shown in FIG. 2 and FIG. 3. It will be noted that downwardly depending flange 38, shown in FIG. 2, is used for increased strength in the substantially unsupported center portion of the vehicle body 12. However, this element may be eliminated as shown in connection with FIG. 3 where additional structural framework is provided in appropriate portions of the trailer.

FIG. 13 and 14 show plate 14 sandwiched between flanges 44 and 22. Joint 57 in these embodiments is sealed in conjunction with flanges, ribs or beads 54, 58. In preferred FIG. 13 a tape seal 100 is compressed between ends 57, 58 and flanges 54, 58. FIG. 14 illustrates a seal by caulking 101, which may contribute adhesive benefits to the integrity of the joint 57.

I claim:

1. A cargo carrying body having walls, floor, roof and end portions comprising:

a plurality of rectangular side plates having top, bottom and side edges;

the side edges of adjacent plates having portions butted together to form a vertical butt joint;

vertical posts having portions joining said plates together, each post having a center web and curved shoulders extending from opposite edges of the web terminating as securement flanges projecting from said shoulders, said web having beads extending substantially normally inwardly therefrom toward said portions of the plates and in the assembled position with the plates flanking the butt joint therebetween and loaded toward adjacent portions of the plates; and top and bottom rails having flanges sandwiching said plates between the flanges thereof and the posts, thereby forming a unitary stress-distributing side-reinforcing structure, said securement flanges in unstressed position diverging away from adjacent plates and in stressed position being drawn against the associated plate portions.

2. The invention according to claim 1; and said beads defining a groove therebetween, said groove opposing said vertical butt joint and running therealong and open thereto; and sealing means filling said groove and bearing against the joint for sealing said vertical butt joint.

3. The invention according to claim 2; and said sealing means comprising a resilient strip compressed by said beads in sealing relation to said butted side edges.

4. The invention according to claim 2; and said sealing means comprising a resilient caulking material.

5. The invention according to claim 3; and a top flanged rail having a downwardly depending portion internally underlapping said top edges, and having an outwardly extending flange, normal thereto, overlapping said top portion;

said downwardly depending and outwardly extending flanges, said plates and said top portion being sealed in a water and weather tight assembly and including a resilient seal.

6. A plate sided cargo carrying body having interconnected floor, roof, front and rear ends and sides comprising:

plates having vertical edges and horizontal top and bottom edges being interconnected to form at said sides, butt joints between respective vertical edges of the plates;

a vertical support joining each pair of plates, said support having flanges overlying the vertical edges of said plates and spaced from said vertical edges, said flanges in unstressed position diverging away from adjacent plates and in stessed position being drawn against the associated plate portions, a pair of interior vertical ribs defining a slot therebetween spaced between said flanges, said slot spanning said butted vertical edges and said support having top and bottom termini;

a top rail extending along and interconnecting said top edges and having an outwardly extending flange overlapping said support, a downwardly extending flange sandwiching said plate against said support, and a roof mounting flange;

a bottom rail extending along and interconnecting said bottom edges, having an outwardly extending flange underlapping said support, a web extending upwardly from said flange and sandwiching said plate against said support; and a substantially flexible seal extending within the plate along said interior of said plates between the top terminus and bottom terminus and sealing the edges of adjacent plates and sealing the support and plates as a water and weather tight unit.

7. The invention according to claim 6; and said vertical supports further comprising:

a center portion between said flanges extending the length of said support and being spaced outwardly of said plates and said flanges; and said ribs projecting inwardly of said center portion toward the respective plates.

8. The invention according to claim 7; and said center portion having shoulders merging into said flange in a continuing section thickness from said center portion to said flanges;

the flanges being substantially no thicker than the plates.

9. The invention according to claim 8; and said vehicle body plates and supports being formed and arranged to maximize the structural strength thereof by spacing the vertical supports closer together at each end than between said ends.

10. The invention according to claim 9; and said flanges and said plate being substantially ⅛ inch thick.

11. A cargo carrying truck body having side walls comprising a plurality of side plates having vertical edges abutting each other and forming a butt joint;

a vertical post member covering said joint and having securing edge flanges extending from opposite side of the said joint;

ribs extruding lengthwise of said post member flanking said joint in close proximity thereto and abutting adjacent plates, and said flanges in unstressed condition diverging from the plates and, fasteners securing and stressing said flanges toward respective plates in flat face engagement therewith.

12. The invention according to claim 11 and said ribs defining a groove therebetween, and a sealing member closing said groove and adhered to said plates at said butt joint for sealing the same.

* * * * *